April 19, 1955     P. W. HARLAND     2,706,396
APPARATUS FOR DETERMINING TEMPERATURE
DRIFT OF EVACUATED CAPSULES
Filed July 31, 1952

INVENTOR.
PHILIP W. HARLAND
BY
ATTORNEY

United States Patent Office 2,706,396
Patented Apr. 19, 1955

2,706,396

APPARATUS FOR DETERMINING TEMPERATURE DRIFT OF EVACUATED CAPSULES

Philip W. Harland, Sellersville, Pa., assignor to American Machine and Metals, Inc., New York, N. Y., a corporation of Delaware Application July 31, 1952, Serial No. 301,909

6 Claims. (Cl. 73—1)

The indicators of aneroid barometers are actuated by the change of shape on an evacuated capsule which responds to the ambient pressure. Such capsules are also affected by ambient temperature. To eliminate the effect of temperature, a metal whose modulus of elasticity does not change with temperature and still has the desirable spring characteristics is sought. It has been found that Ni-Span-C, an alloy of nickel, iron, chromium and titanium, possesses these characteristics in a high degree.

In the application filed by Philip W. Harland on May 9, 1952, Serial No. 287,073, it is shown that Ni-Span-C offers further advantages.

As there explained, this metal possesses the unique characteristic that, dependent upon the type of heat treatment after the parts of the capsule have been formed, the capsule will either be indifferent to temperature changes or will have a slight positive drift that increases the indications of the aneroid barometer, or a slight negative drift in the opposite direction that decreases the indication of the aneroid barometer as the ambient temperature rises.

In this way an entirely new result can be achieved. Not only will the error in reading due to the effect of temperature on the capsule be eliminated, but the capsule may be so selected that the slight drift remaining in the capsule will offset and correct for the errors in the indication of the barometer introduced by the effect of temperature changes on the rest of the apparatus.

For the first time, by selecting a capsule that has the proper infinitesimal drift in the right direction, an aneroid barometer will function at widely different altitudes and under widely different temperatures without adding troublesome temperature correction devices.

The present invention relates to the apparatus for testing the capsules after they have been heat treated and evacuated to determine this slight drift with temperature, so that the capsule that is incorporated in any particular instrument will have drift characteristics that will neutralize errors created by temperature changes in other parts of the instrument.

Since the method of testing to determine the drift of the completely evacuated capsule involves subjecting the capsule to widely different temperatures and a very precise measurement of the expansion of the capsule, the method can also be used to detect the capsules which may have a very slight leak and which would therefore lose their calibration in the course of time. The presence of any air whatsoever in the capsule will greatly increase the drift as the temperatures rise due to the expansion of pressure of the gas in the capsule.

The invention consists of an apparatus in which each capsule to be tested may be mounted, subjected to widely different temperatures, and the expansion measured with great precision. Since the drift with temperature of the capsule is very slight, it is essential that the part of the testing apparatus itself that is immersed in the hot and cold bath have a minimum change in size. Then as the capsule is alternately subjected to a high temperature and to a low temperature, the expansion reading will be that of the capsule.

The invention provides a support made of a material having a very small expansion which permits immersing the diaphragm alternately in a hot bath, which may be boiling water, and a cold bath, which may be a mixture of acetone and Dry Ice. Quartz is one such material.

One object of the invention is to provide an apparatus for testing the expansion of an evacuated capsule when held at a substantially constant pressure due to a change in temperature.

A further object of the invention is to distinguish between capsules having a negligible expansion with temperature and those having a positive and a negative drift.

A further object is to detect evacuated capsules that have a slight leak by their response to a sharp temperature change.

While not limited to testing capsules for aneroid barometers, the invention is exemplified here as applied to testing such diaphragm or capsules.

Figure 3:
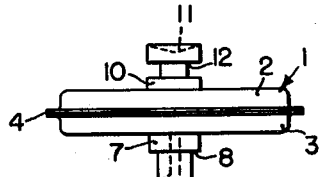
Fig. 3 is a section through a specimen adapted to be tested.

1 represents the capsule whose expansion coefficient is to be measured. This may, by way of example but not limitation, be a capsule of the type shown in Fig. 3 consisting of two stamped sections 2 and 3, each having a rim. These rims are fastened together at 4 by brazing, pressing, welding or in any other manner.

The section 3 may be attached to a post 7 having a shoulder 8 and a shank 9. The entire capsule is supported on shank 9. This shank has a passage 6 through which the capsule is evacuated after which it is sealed. A plug 10 may be attached to the center of the section 2 and this plug may have a depression 11 in its upper end where the feeler to be moved by the capsule contacts the capsule. The plug may be provided with a groove 12 and a spring clip 13, having forked ends, may enter into the groove 12 of the plug and draw the feeler 14 into depression 11.

The specimen 1 which is to be tested is supported in a frame which consists of the chassis 16 which may be a Bakelite piece and the various parts carried thereby. There may be slots 15 cut into each end. These slots may cut across holes 17, 18 referred to below. Screws 20 may be provided to draw the two sides of the slot together.

The chassis 16 is supported on posts 21 which are preferably made of fiber to prevent temperature changes being carried from the bath to the chassis. These posts may extend through holes 18 in chassis 16. Each post 21 may be joined to a metal rod 22 which has a foot 23, rods 22 being connected by crossties 28 for rigidity. The entire chassis is supported on these feet and may be lifted from one container 24 and set in another similar container.

The specimen is carried on a quartz frame comprising a bar 25 suspended from quartz rods 26 which may extend through holes 17 in the chassis and clamped therein by drawing up on screws 20.

The rods 26 are integral with the quartz base 25. The base 25 and the lower end of the quartz posts 26 may be cut out of a single piece of quartz as indicated at 27 and the rods 26 fused thereto at 29.

The quartz bar 25 may carry means for supporting the specimen. Thus, the bar 25 may be drilled at its center, and a sleeve 30, threaded at its lower end and having a shoulder 31 at its upper end, may be inserted in the hole and a nut 32 at the lower end of the sleeve used to draw the sleeve snugly into the hole. The bore 33 of the sleeve may be made to fit the shank 9 of the specimen and the specimen may be locked into place by a set screw indicated at 34.

The expansion of the specimen is picked up by the feeler 14 attached to a quartz rod 35.

This quartz rod may carry the movable core 36 in a specially designed differential transformer 37 supported on the chassis. Such a transformer is described in Patent 2,427,866, granted to W. D. MacGeorge. Alternating current from an outside source 40 passes through coil 41. The magnetic field created, passing through core 36, creates opposed voltages in the opposed coils 42, 43.

As the core 36 is moved, the voltage of one of the coils 42, 43 exceeds that of the other and current flows through circuits 44 and is indicated on volt meter 45.

This transformer has linear characteristics—the voltage of the current generated in the transformer varies as the displacement of the movable core, and thus serves to indicate the expansion or contraction of the capsule. The upper end of the quartz rod may be guided in a hole in plate 38 carried by the chassis. The transformer may be surrounded by a guard 39 to keep radiant heat from the bath from affecting the transformer.

Figure 1:
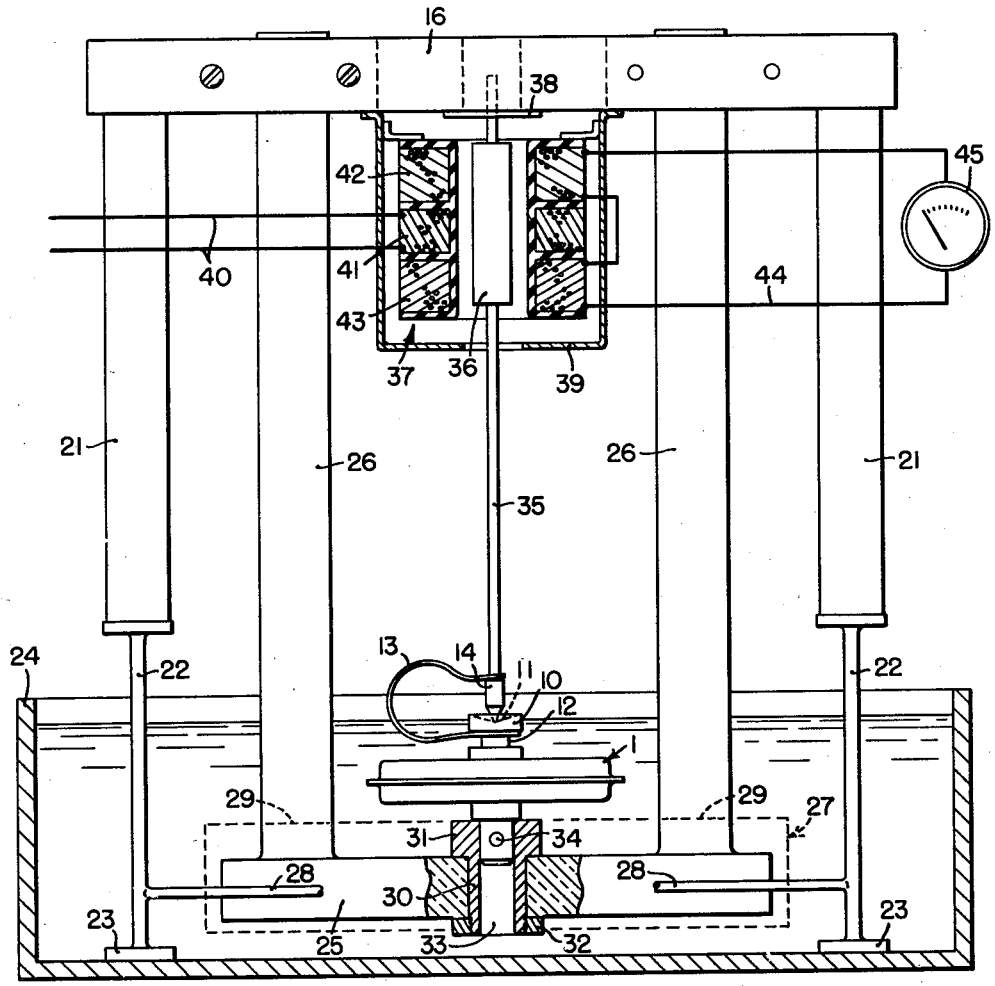
Fig. 1 is an elevation, partly in section, of the apparatus.
Figure 2:
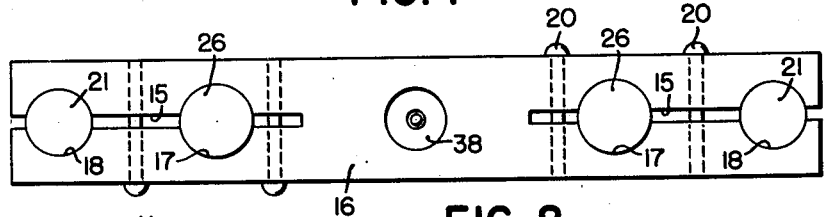
Fig. 2 is a top view of the apparatus.

In using the apparatus to measure the expansion coefficient to a specimen, the specimen is mounted on the quartz base 25 and the feeler 14 adjusted against the other end of the specimen. The entire frame is then placed in the position shown on Fig. 1 in a bath in a dish 24 and the position of the feeler relative to the frame noted. The entire frame with specimen is then moved to another dish containing liquid at a different temperature, and the change of position of the feeler relative to the frame is noted.

In order to get a wide range of temperature variation for the test which remains constant, one bath may be boiling water, while the other bath may be a mixture of acetone and liquid air.

Since this device will detect the slightest difference in response to temperature with constant pressure of successive capsules, it is obvious that it will also detect a defective capsule. If any air has leaked into the capsule, the difference of temperature between the two baths will cause the expanded gas to exert a pressure on the inside of the capsule at a higher temperature. This increase in pressure will give the capsule a positive drift so far in excess of that resulting from the characteristics of the metal that the defective diaphragm is readily noted.

In the practice of this method, each evacuated capsule is successively mounted so that its shank 9 fits into the bore 33 and the shoulder 8 bears against the flange 31. The set screw 34 is tightened. The entire apparatus is now set in a bath of boiling water in container 24. This will cause the capsule to "drift." If the drift is positive, shaft 35 is elevated; if the drift is negative, shaft 35 is lowered slightly. The core 36 moving relative to the coil 37 in the manner characteristic of a differential transformer, will cause current to flow in circuit 44 connected to a volt meter 45. The reading of the volt meter will indicate the displacement of the core 36 axially relative to the coil 37. The entire apparatus is now lifted out of the bath and set in a similar bath containing a mixture of acetone and liquid air. This subjects the capsule to a sharp change in temperature, both to the capsule and to a portion of the quartz supports 25, 26. The quartz has practically a zero coefficient; in any event, the relative contraction of the columns 26 will be the same in the tests of each capsule. The quartz rod 35 will always move the same amount causing the same change in the volt meter reading if the capsule has no drift. By noting the actual change in the volt meter reading, the drift of the capsule, however small, can be measured and noted.

If any capsule is defective, drift will be excessive and the capsule rejected. If the drift is within the normal range, the drift of the particular capsule will be noted and in each assembly of an aneroid barometer, a capsule having the appropriate drift to offset the drift of the rest of the apparatus will be used.

What I claim is:

1. In a means for testing a capsule having a supporting shank and a motion transmitting plug, the combination comprising, a chassis, a non-expansible U frame suspended from the underside of said chassis, means carried by the horizontal portion of said frame engaging the shank of said capsule, a non-expansible follower engaging said plug and passing through said chassis, a differential transformer mounted on said chassis whose core is moved by said feeler, and indicating means for detecting the expansion of said capsule actuated by the voltage output of said differential transformer, and means for surrounding said capsule and a portion of said U shaped frame with a bath.

2. In a means for testing a capsule having a supporting shank and a motion transmitting plug having a circular groove, the combination comprising, a chassis, a non-expansible U frame suspended from the underside of said chassis, means carried by the horizontal portion of said frame engaging the shank of said capsule, a non-expansible follower engaging said plug and passing through said chassis, a spring clip engaging said groove drawing said follower and said capsule together, a differential transformer mounted on said chassis whose core is moved by said feeler, and indicating means for detecting the expansion of said capsule actuated by the voltage output of said differential transformer, and means for surrounding said capsule and a portion of said U shaped frame with a bath.

3. A device for testing a capsule having a supporting shank and a motion transmitting plug having a circular groove, the combination including a chassis, feet to support said chassis in a horizontal position, a non-expansible U frame suspended from the underside of said chassis, means carried by the horizontal portion of said frame engaging the shank of said capsule, a non-expansible follower engaging said plug and passing through said chassis, a spring clip engaging said groove drawing said follower and said capsule together, a differential transformer mounted on said chassis whose core is moved by said feeler, indicating means for detecting the expansion of said capsule actuated by the voltage output of said differential transformer, and a container adapted to hold liquid in which said feet are set.

4. In an apparatus for testing a capsule having a supporting shank and a motion transmitting plug having a circular groove, the combination including a chassis, feet to support said chassis in a horizontal position, a non-expansible U frame suspended from the underside of said chassis, a sleeve carried by the horizontal portion of said frame into which the shank of said capsule fits, a non-expansible follower engaging said plug and passing through said chassis, a spring clip engaging said groove drawing said follower and said capsule together, a differential transformer mounted on said chassis whose core is moved by said feeler, indicating means for detecting the expansion of said capsule actuated by the voltage output of said differential transformer, and a container adapted to hold liquid in which said feet are set.

5. In a device for determining temperature drift or the like in an expansible and contractible capsule means having a shank and an indicator movement producing member, the combination including a chassis, means for positioning said chassis at predetermined positions relative to baths of widely varying temperature, depending hanger means extending from said chassis, capsule shank support means carried by said hanger means in a plane substantially perpendicular thereto, indicator means located on said chassis, and a motion transmitting rod connecting said indicator means and the movement producing member of a capsule means located on said support means, said rod and hanger means being made of non-expansible material so that wide changes in temperature to which the capsule means is subjected will not cause errors due to expansion of the device.

6. In a device for determining temperature drift or the like in an expansible and contractible capsule means having a shank and an indicator movement producing member, the combination including a chassis, means for positioning said chassis at predetermined positions relative to baths of widely varying temperature, depending hanger means extending from said chassis, capsule shank support means carried by said hanger means in a plane substantially perpendicular thereto, indicator means located above said support means, and a motion transmitting rod connecting said indicator means and the movement producing member of a capsule means on said support means, said rod and support means being made of quartz so that wide changes in temperature to which the capsule means is subjected will not cause errors due to expansion of the device.

References Cited in the file of this patent

UNITED STATES PATENTS

| 2,279,368 | Dietert | Apr. 14, 1942 |
| 2,504,985 | Kallas et al. | Apr. 25, 1950 |
| 2,559,789 | Peckham | July 10, 1951 |

OTHER REFERENCES

Bureau of Standard Circular No. 46, December 26, 1922.